(12) United States Patent
Fazekas et al.

(10) Patent No.: US 8,220,713 B2
(45) Date of Patent: Jul. 17, 2012

(54) ILLUMINATION DRIVER CIRCUIT FOR USING IN IMAGING-BASED BARCODE READER

(75) Inventors: Peter Fazekas, Bayport, NY (US); James Giebel, Centerport, NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 12/973,965

(22) Filed: Dec. 21, 2010

(65) Prior Publication Data
US 2012/0153024 A1 Jun. 21, 2012

(51) Int. Cl.
*G06K 7/10* (2006.01)
*G08C 21/00* (2006.01)

(52) U.S. Cl. ............ 235/462.06; 235/454; 235/455; 235/462.11; 235/462.42; 235/462.45

(58) Field of Classification Search .......... 235/454, 235/462.01, 462.14, 462.15, 462.42, 462.45, 235/462.49, 472.01–472.03, 455, 462.06, 235/462.24
See application file for complete search history.

(56) References Cited

U.S. PATENT DOCUMENTS

| | | | |
|---|---|---|---|
| 7,451,929 B2 * | 11/2008 | DiGiovanna | 235/441 |
| 2002/0008145 A1 * | 1/2002 | Walsh et al. | 235/462.46 |
| 2006/0022640 A1 * | 2/2006 | Frith et al. | 320/125 |
| 2006/0221604 A1 * | 10/2006 | Martin et al. | 362/191 |
| 2008/0048567 A1 * | 2/2008 | Steele et al. | 315/151 |
| 2008/0084196 A1 * | 4/2008 | Lacombe et al. | 323/282 |
| 2008/0272651 A1 * | 11/2008 | Fong | 307/31 |
| 2010/0019693 A1 * | 1/2010 | Hoogzaad et al. | 315/294 |
| 2011/0204797 A1 * | 8/2011 | Lin et al. | 315/161 |

* cited by examiner

*Primary Examiner* — Thien M. Le
*Assistant Examiner* — Tuyen K Vo
(74) *Attorney, Agent, or Firm* — Nong-Qiang Fan (57) ABSTRACT

Illumination driver circuit for using in an imaging-based barcode reader is configured to provide the driving current for the illumination source with a Buck regulator when the driving current is above a threshold current value and to provide the driving current for the illumination source with a linear regulator when the driving current is not above the threshold current value. The threshold current value is substantially close to the smallest current the Buck regulator operative to provide when operating in a continuous mode.

16 Claims, 6 Drawing Sheets

PRIOR ART

ILLUMINATION DRIVER CIRCUIT FOR USING IN IMAGING-BASED BARCODE READER

FIELD OF THE DISCLOSURE

The present disclosure relates generally to imaging-based barcode readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

Figure 1:
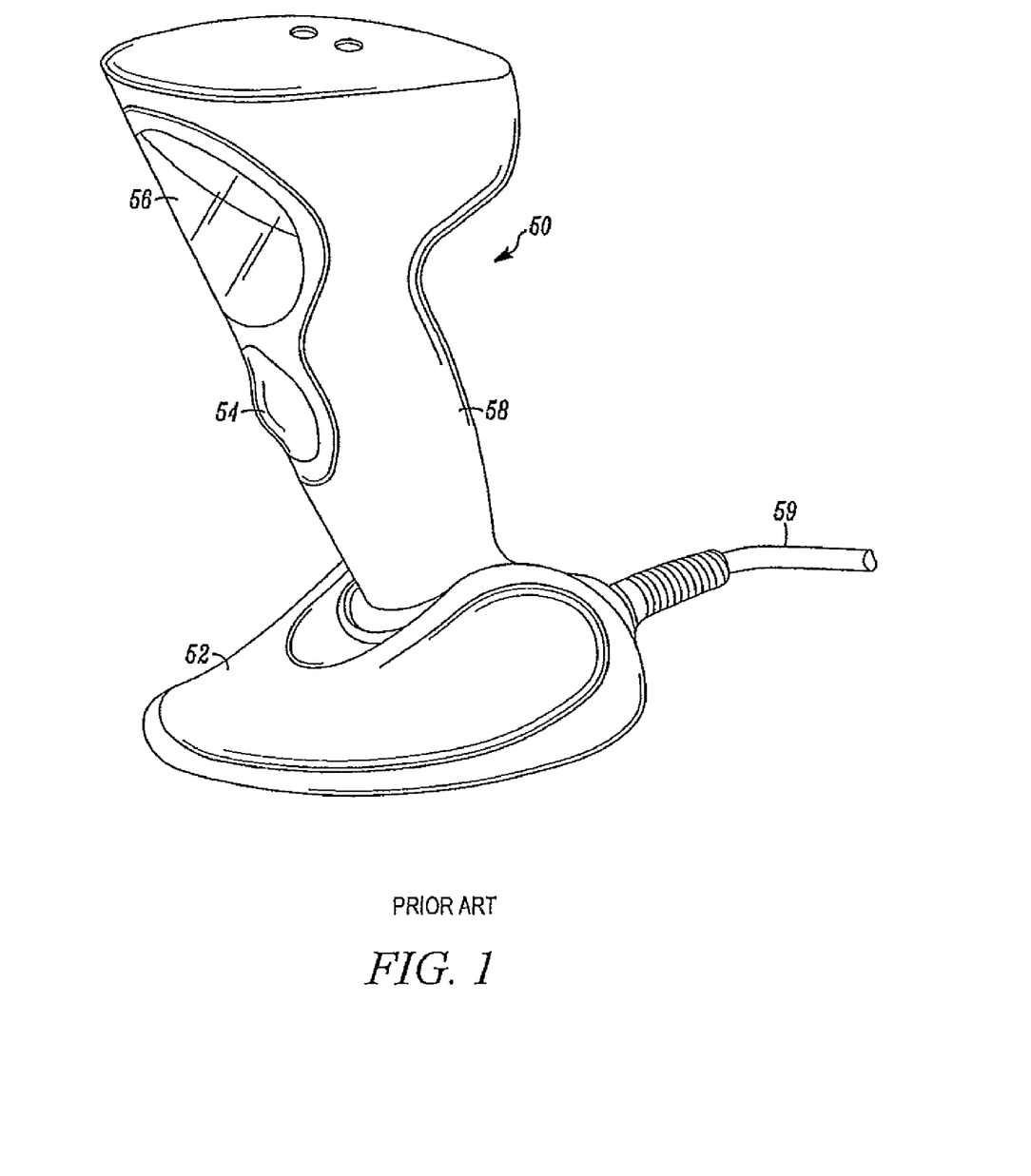
FIG. 1 shows an imaging scanner in accordance with some embodiments.

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes.

SUMMARY

In one aspect, the invention is directed to an apparatus. The apparatus includes (1) an illumination source for providing illumination directed toward a target object, (2) a solid-state imager having an array of photosensitive elements for capturing an image from the target object, and (3) an illumination driver circuit operative to provide a driving current for the illumination source. The illumination driver circuit, which includes a Buck regulator and a linear regulator, is configured to provide the driving current for the illumination source with the Buck regulator when the driving current is above a threshold current value and to provide the driving current for the illumination source with the linear regulator when the driving current is not above the threshold current value. The threshold current value is substantially close to the smallest current the Buck regulator operative to provide when operating in continuous mode.

The advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
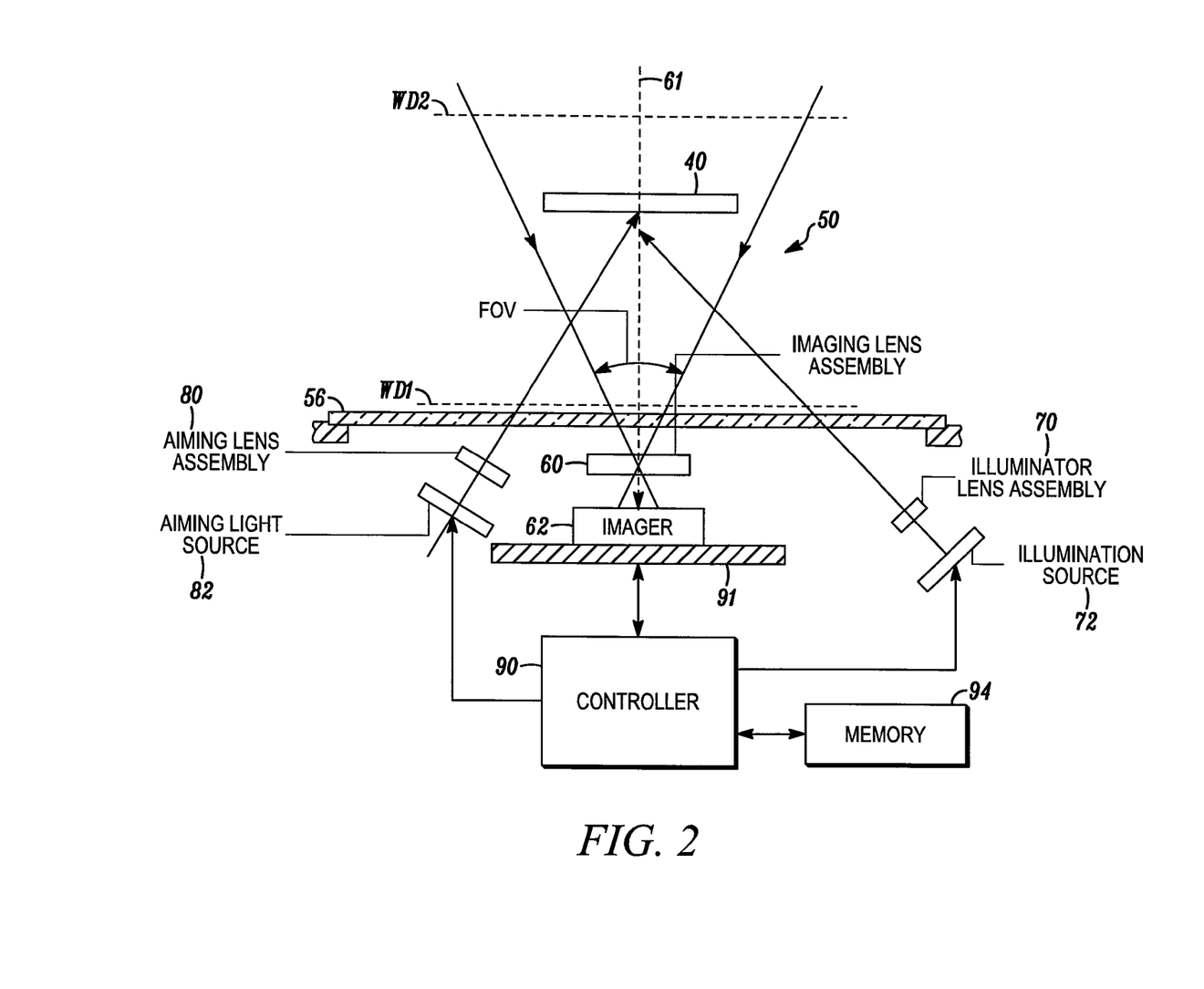
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) a solid-state imager 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical path or axis 61 through the window 56. Generally, the solid-state imager 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 2, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

In FIG. 2, the illumination provided by the illumination source 72 is often required to maximize the reading range of the imaging scanner 50. This illumination is typically provided by LED sources. The illumination can be either high intensity pulses of short duration, or continuous illumination at a much lower intensity. One of the most efficient methods of controlling the high currents required for pulse illumination is a switching Buck regulator. This type of regulator runs at a fixed frequency and controls the output power by adjusting the duty cycle of its switching waveform. When current requirements are reduced below a specific threshold (such as when illumination is changed from pulse mode to continuous mode), the duty cycle drops too low and the regulator changes from continuous run at a fixed frequency to either pulse skipping or burst mode. Both pulse skipping and burst modes are discontinuous modes of operation where the regulator operation frequency randomly changes between a range of values. Sensitive imaging electronics is susceptible to corruption from power supply noise. The power supply is tuned to operate at a frequency that minimizes interference with the rest of the system. If the power supply does not run at a fixed frequency, the system becomes more susceptible to power supply noise. Therefore, it is desirable to eliminate or minimize the effects of the power supply noise on the imaging electronics.

Figure 3:
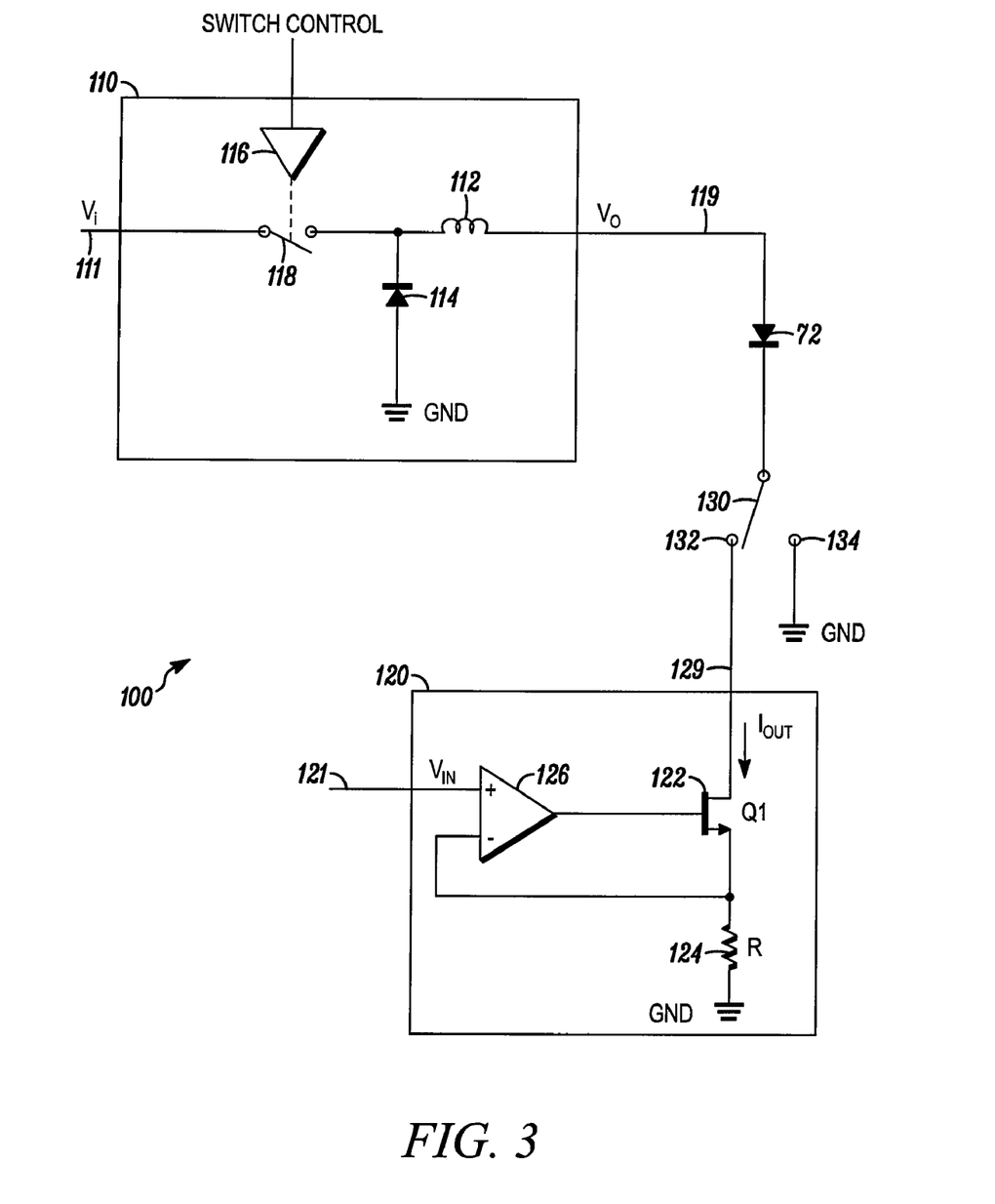
FIG. 3 shows an improved illumination driver circuit that is operative to provide a driving current for the illumination source scanner in accordance with some embodiments.

FIG. 3 shows an improved illumination driver circuit that is operative to provide a driving current for the illumination source 72 scanner in accordance with some embodiments. The illumination source 72 can include one or more light emitting diodes. In FIG. 3, the illumination driver circuit 100 includes a Buck regulator 110, a linear regulator 120, and a selection switch 130. When the selection switch 130 makes a connection with the terminal 132, the illumination source 72 is electrically connected between the Buck regulator 110 and the linear regulator 120. When the selection switch 130 makes a connection with the terminal 134, one terminal of the illumination source 72 is electrically connected to the ground GND.

A Buck regulator (also known as Buck converter) generally is a switching based DC-to-DC down converter, and it includes at least one switch and one inductor. Even though there are many possible implementations for the Buck regulator, one classical implementation of the Buck regulator 110 includes a switch 118, an inductor 112, and a diode 114. The Buck regulator 110 can also include a switch driver 116 for driving the switch 118 between a closed state and an open state.

Figure 4A:
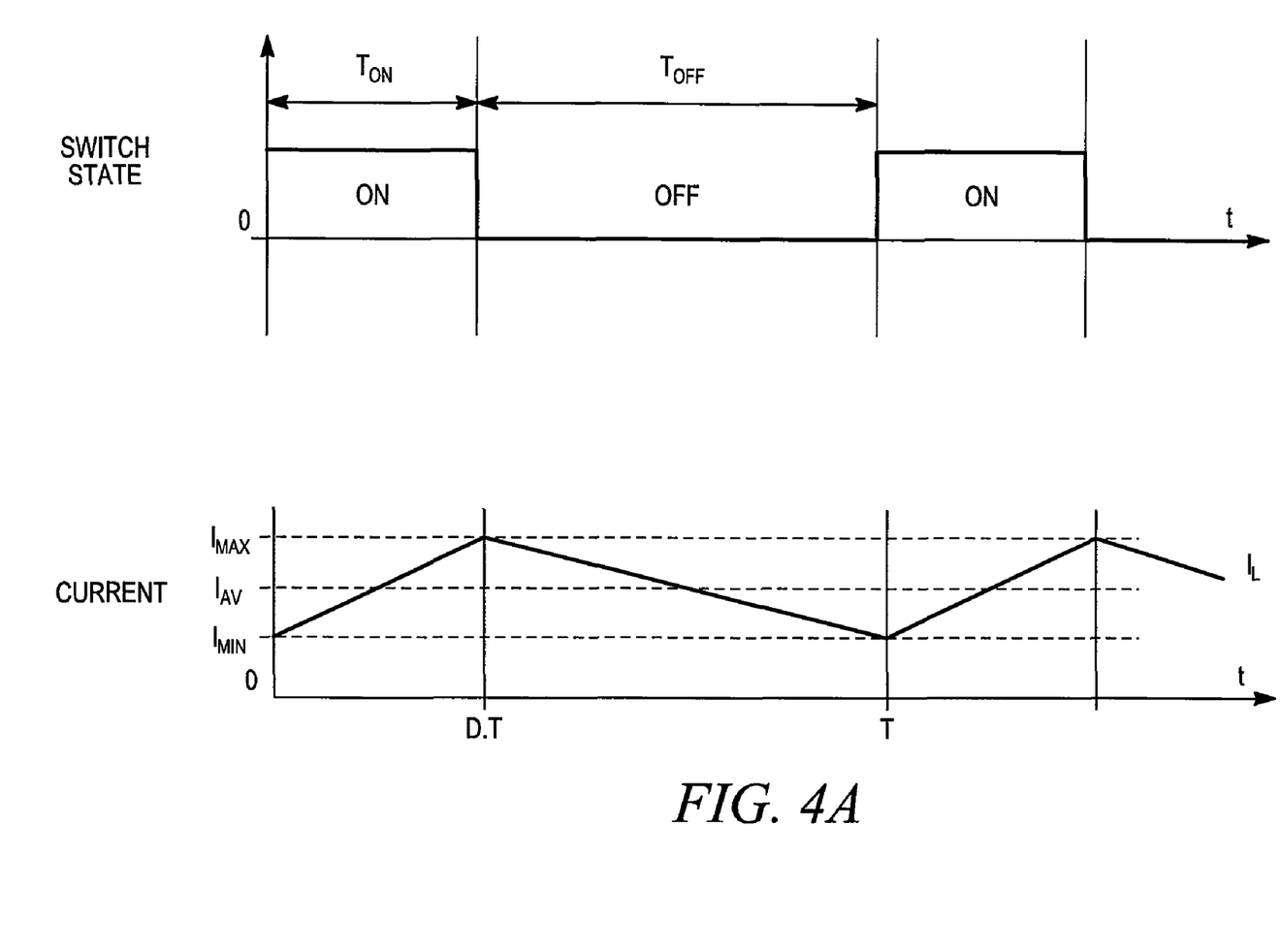
FIG. 4A is a timing diagram of the Buck regulator operates in the continuous mode in accordance with some embodiments.

In general, the Buck regulator 110 can operate in the continuous mode or the discontinues mode. When the Buck regulator 110 operates in the continuous mode, as shown in FIG. 4A, the switch 118 periodically alternates between the closed state and the open state. During the time period $T_{on}$, the switch 118 is set to the closed state, and the current in the inductor 112 ramps up from the minimal current $I_{min}$ to the maximum current $I_{max}$. During the time period $T_{off}$, the switch 118 is set to the open state, and the current in the inductor 112 ramps down from the maximum current $I_{max}$ to the minimal current $I_{min}$. The average DC voltage $V_o$ at the output 119 of the Buck regulator 110 is proportional to the input DC voltage $V_i$ at the input 111. Specifically, $V_o = DV_i$, where D is the duty cycle defend as $D = T_{on}/(T_{on} + T_{off})$. Because the duty cycle D is always less than one, the average DC voltage $V_o$ at the output 119 is always less the input DC voltage $V_i$ at the input 111.

Figure 4B:
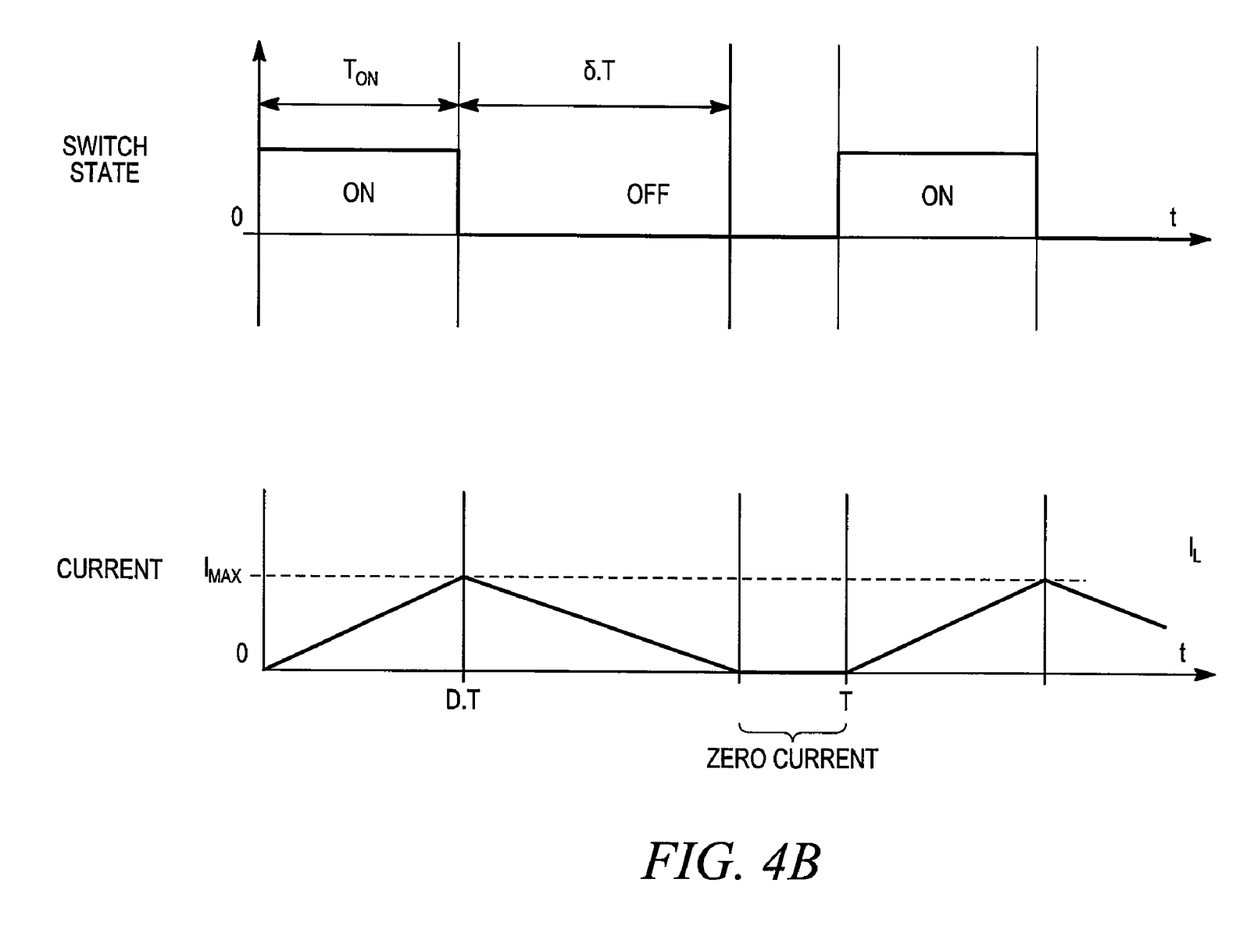
FIG. 4B is a timing diagram of the Buck regulator operates in the discontinuous mode in accordance with some embodiments.

When the Buck regulator 110 operates in the discontinuous mode, as shown in FIG. 4B, the switch 118 can be turned on occasionally or randomly. In the discontinuous mode, after the switch 118 is turned off, the current in the inductor 112 generally decays to zero and maintains at zero for some time before the switch 118 is turned on again. In FIG. 4B, the label "ZERO CURRENT" indicates the time period during which the current in the inductor 112 is essentially zero.

In general, when the Buck regulator 110 operating in the continuous mode is used to drive a load, for each given output voltage, there is a defined smallest current value that the Buck regulator can provide. That is, if the current required by the load is smaller than this defined smallest current value, the Buck regulator 110 has to operate in the discontinuous mode.

The illumination driver circuit 100 is configured to have certain threshold current value that is substantially close to the smallest current the Buck regulator 110 can provide when operating in the continuous mode. In some impregnations, this threshold current value is designed to be equal to the smallest current the Buck regulator 110 can provide when operating in the continuous mode, while in other implementations, this threshold current value is designed to be 2%, 5%, or 10% lager than that smallest current. The illumination driver circuit 100 is configured to provide the driving current for the illumination source 72 with the Buck regulator 110 when the driving current is above the threshold current value and to provide the driving current for the illumination source 72 with the linear regulator 120 when the driving current is not above the threshold current value.

In the implementation as shown in FIG. 3, when the driving current required for the illumination source 72 is larger than the threshold current value, the Buck regulator 110 operates in the continues mode, and the selection switch 130 makes a connection with the terminal 134 to connect the illumination source 72 to the ground GND. The average DC voltage $V_o$ applied to the illumination source 72 can be adjusted by changing the duty cycle D for driving the switch 118. But when the driving current required for the illumination source 72 is not larger than the threshold current value, the selection switch 130 makes a connection with the terminal 132 to connect the illumination source 72 with the linear regulator 120, and the Buck regulator 110 is constantly closed such that the DC voltage $V_o$ applied to the illumination source 72 is set to be equal to the input DC voltage $V_i$ at the input 111. The driving current applied to the illumination source 72 can be adjusted by changing an input voltage $V_{in}$ at the input 121 of the linear regulator 120. Even though there are many possible implementations for the linear regulator 120, one classical implementation of the linear regulator 120 includes a field effect transistor 122, a resistor 124, and an operation amplifier 126.

Figure 5:
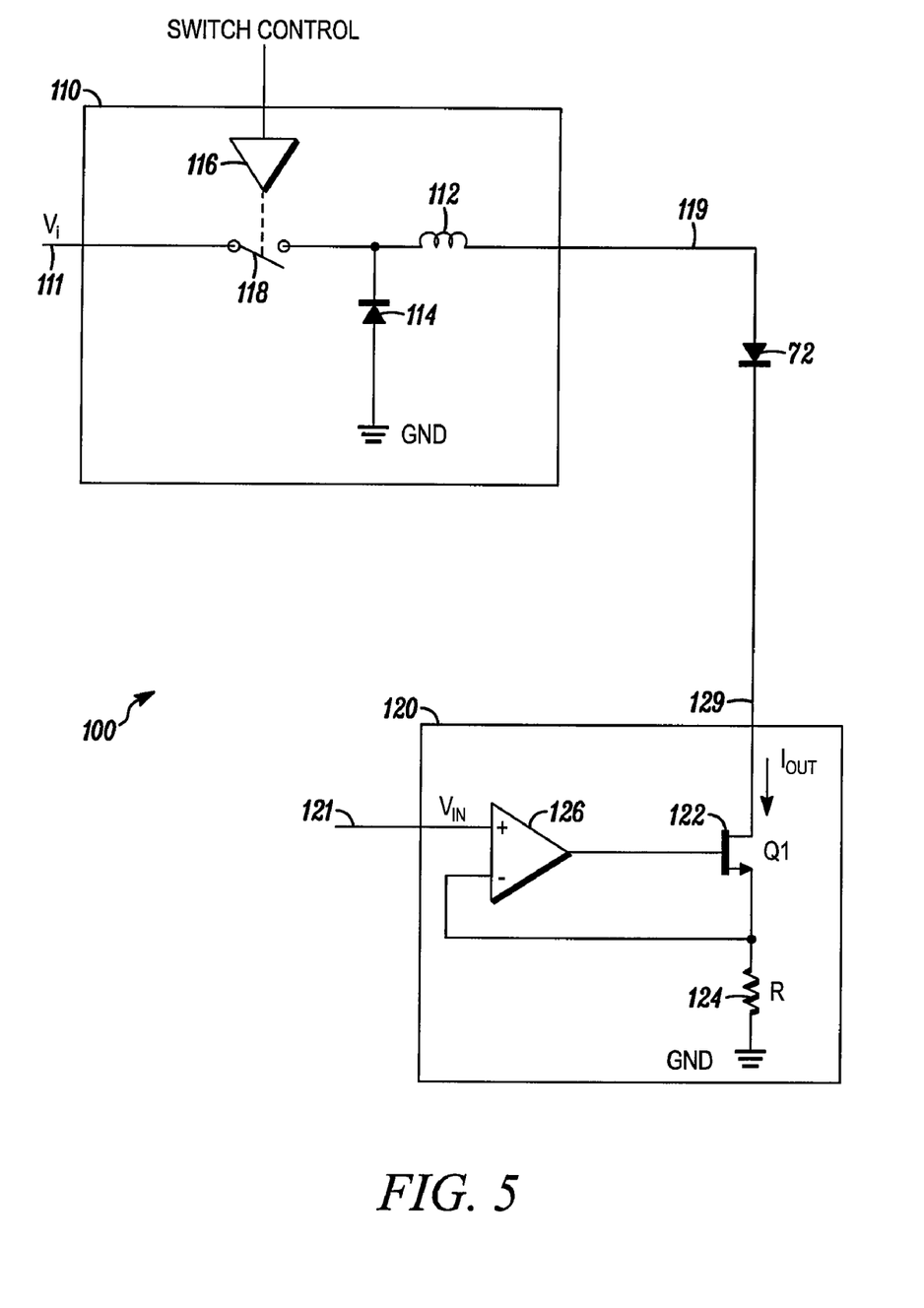
FIG. 5 shows an alternative implementation of the illumination driver circuit.

In an alternative implementation as shown in FIG. 5, the selection switch 130 in FIG. 3 can be removed and the illumination source 72 can be directly connected with the linear regulator 120. In operation, when the driving current required for the illumination source 72 is larger than the threshold current value, the Buck regulator 110 operates in the continues mode, and certain voltage is applied to the input 121 of the linear regulator 120 to drive the field effect transistor 122 into the saturation state and to make the channel of the field effect transistor 122 practically equivalent to a small resistor. That is, when certain voltage is applied to the input 121 of the linear regulator 120, the illumination source 72 is practically connected to the ground GND through the resistor 124 and a negligibly small resistor provided by the channel of the field effect transistor 122. But when the driving current required for the illumination source 72 is not larger than the threshold current value, the linear regulator 120 in FIG. 5 can operate the same way as the linear regulator 120 in FIG. 3.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   an illumination source for providing illumination directed toward a target object;
   a solid-state imager having an array of photosensitive elements for capturing an image from the target object; and
   an illumination driver circuit operative to provide a driving current for the illumination source, the illumination driver circuit comprising a Buck regulator and a linear regulator, wherein the illumination driver circuit is configured to provide the driving current for the illumination source with the Buck regulator when the driving current is above a threshold current value and to provide the driving current for the illumination source with the linear regulator when the driving current is not above the threshold current value, and wherein the threshold current value is substantially close to the smallest current the Buck regulator operative to provide when operating in a continuous mode.

2. The apparatus of claim 1, wherein the threshold current value is 10% larger than the smallest current the Buck regulator operative to provide when operating in the continuous mode.

3. The apparatus of claim 1, wherein the threshold current value is 5% larger than the smallest current the Buck regulator operative to provide when operating in the continuous mode.

4. The apparatus of claim 1, wherein the threshold current value is 2% larger than the smallest current the Buck regulator operative to provide when operating in the continuous mode.

5. The apparatus of claim 1, wherein the Buck regulator comprises two linear switches and an inductive element.

6. The apparatus of claim 1, wherein the Buck regulator, the linear regulator, and the illumination source are connected in serial, with the illumination source connected between the Buck regulator and the linear regulator.

7. The apparatus of claim 1, wherein the illumination source comprises a light emitting diode.

8. The apparatus of claim 1, wherein the illumination source comprises a plurality of light emitting diode.

9. An apparatus comprising:
   an illumination source for providing illumination directed toward a target object having a barcode thereon;
   a solid-state imager having an array of photosensitive elements for capturing an image of the barcode on the target object;
   an illumination driver circuit comprising a Buck regulator configured to provide a driving current for the illumination source with the Buck regulator only if the driving current is above a threshold current value, the threshold current value being substantially close to the smallest current the Buck regulator operative to provide when operating in a continuous mode; and
   a decoding circuit operative to decode the barcode from the image of the barcode.

10. The apparatus of claim 9, wherein the Buck regulator comprises two linear switches and an inductive element.

11. The apparatus of claim 9, wherein the threshold current value is at most 10% larger than the smallest current the Buck regulator operative to provide when operating in the continuous mode.

12. A method comprising:
    determine a driving current required for an illumination source to provide illumination directed toward a target object;
    generating the illumination directed toward the target object by providing the driving current to the illumination source with a Buck regulator if the driving current required is above a threshold current value and by providing the driving current to the illumination source with a linear regulator if the driving current required is not above the threshold current value; and
    capturing an image of the target object with a solid-state imager having an array of photosensitive elements.

13. The method of claim 12, wherein the threshold current value is substantially close to the smallest current the Buck regulator operative to provide when operating in the continuous mode.

14. The method of claim 12, wherein the threshold current value is at most 10% larger than the smallest current the Buck regulator operative to provide when operating in the continuous mode.

15. The method of claim 12, wherein the threshold current value is at most 10% larger than the smallest current the Buck regulator operative to provide when operating in the continuous mode.

16. The method of claim 12, wherein a step for generating the illumination directed toward the target object comprises:
    providing the driving current to at least one light emitting diode.

* * * * *